(12) United States Patent
Okabe (10) Patent No.: US 6,606,133 B1
(45) Date of Patent: Aug. 12, 2003

(54) LIGHT DIFFUSING SHEET WITH DIRECTION-DEPENDENT DIFFUSING ABILITY

(75) Inventor: Motohiko Okabe, Gobo (JP)

(73) Assignee: Keiwa Inc., Osaka (JP)

( * ) Notice: Subject to any disclaimer, the term of this patent is extended or adjusted under 35 U.S.C. 154(b) by 0 days.

(21) Appl. No.: 09/497,740

(22) Filed: Feb. 4, 2000

(30) Foreign Application Priority Data

Feb. 4, 1999 (JP) ............................................ 11-027723

(51) Int. Cl.[7] ............................................ G02F 1/1335
(52) U.S. Cl. ............................ 349/65; 349/64; 349/112; 362/31
(58) Field of Search ............................ 349/65, 64, 112; 362/31

(56) References Cited

U.S. PATENT DOCUMENTS

| | | | | |
|---|---|---|---|---|
| 5,961,198 | A | * 10/1999 | Hira et al. ..................... | 349/65 |
| 5,995,288 | A | * 11/1999 | Kashima et al. ............... | 349/74 |
| 6,147,804 | A | * 11/2000 | Kashima et al. ............. | 359/599 |
| 6,231,200 | B1 | * 5/2001 | Shinohara et al. ............ | 362/31 |

FOREIGN PATENT DOCUMENTS

| | | |
|---|---|---|
| JP | 57-013403 | 1/1982 |
| JP | 4-314522 | 11/1992 |
| JP | HEI 5-73602 | 10/1993 |
| JP | 6-34961 | 2/1994 |
| JP | 6-102506 | 4/1994 |
| JP | 6-109925 | 4/1994 |
| JP | 6308485 | * 11/1994 |
| JP | 6-347613 | 12/1994 |
| JP | 8-146417 | 6/1996 |
| JP | 9-265092 | 10/1997 |
| WO | WO 96/37805 | 11/1996 |

* cited by examiner

Primary Examiner—Julie Ngo
(74) Attorney, Agent, or Firm—Marshall, Gerstein & Borun (57) ABSTRACT

A light diffusing sheet capable of changing a backward and forward diffusing ability and a right and left diffusing ability to be adapted to both luminance distribution in a direction perpendicular to a lamp and luminance distribution in the direction parallel to the lamp, and thereby increasing light emanating in a normal direction in either direction and a back light unit using the light diffusing sheet. A light diffusing sheet 1 for use in a back light unit of a liquid crystal display includes light diffusing means which has a backward and forward diffusing ability and a right and left diffusing ability that differ from each other. The light diffusing means includes longitudinally divided spindle shaped convex regions or concave regions formed on a sheet surface, quadrangular pyramid shaped convex regions or concave regions each having a rectangular bottom surface, spindle-shaped light diffusing material dispersed in the sheet with central axes thereof directed in a backward and forward direction or in a right and left direction, and a light diffusing layer in which the spindle-shaped light diffusing materials is dispersed.

8 Claims, 8 Drawing Sheets

LIGHT DIFFUSING SHEET WITH DIRECTION-DEPENDENT DIFFUSING ABILITY

BACKGROUND OF THE INVENTION

1. Field of the Invention

The present invention relates to a light diffusing sheet used in a back light unit for a liquid crystal display and a back light unit using the light diffusing sheet.

2. Description of the Related Art

Figure 6:
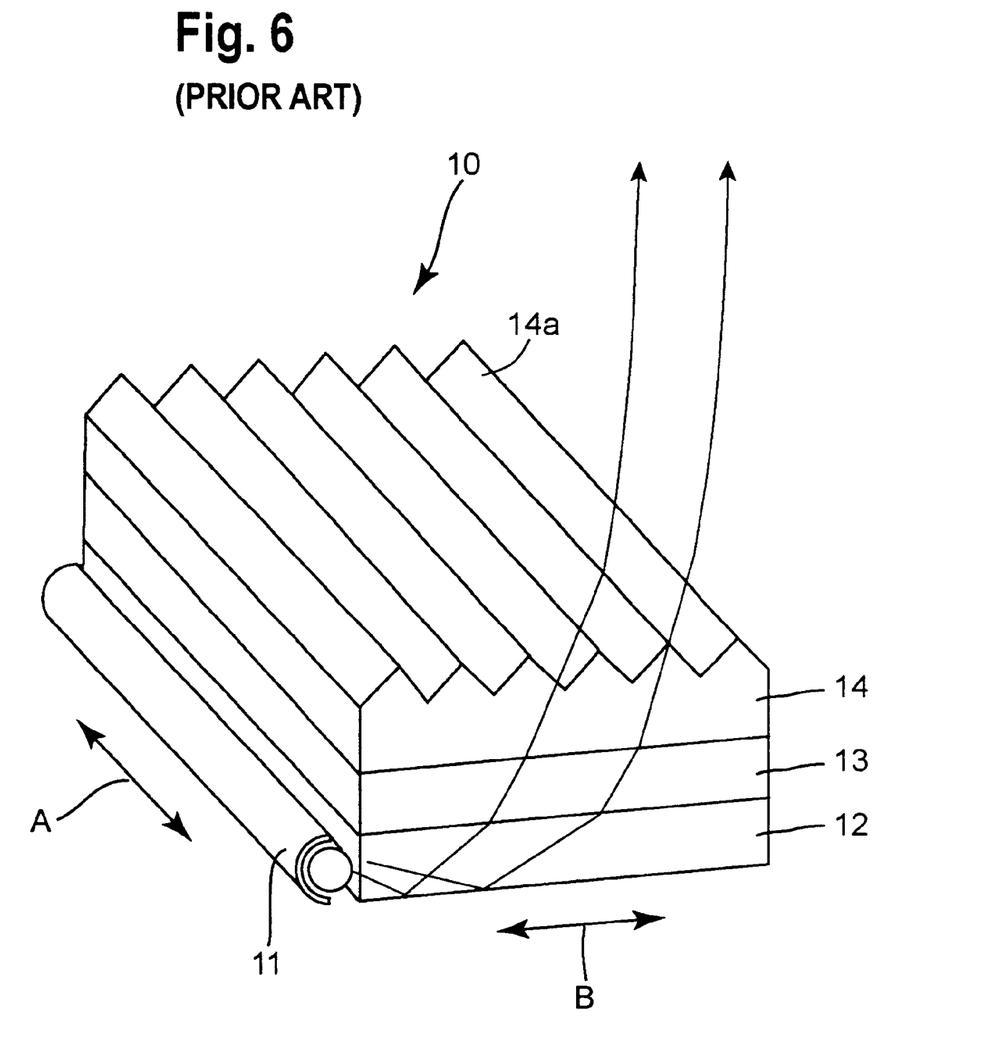
FIG. 6 is a schematic perspective view of a general back light unit.

For liquid crystal displays, a back light system in which a back surface of a liquid crystal layer is illuminated to thereby emit light has spread, and the back light unit is provided on a lower surface side of the liquid crystal layer. In general, as shown in FIG. 6, a back light unit 10 comprises a linear lamp 11 as alight source, a light guiding plate 12 placed such that its ends are adapted to those of the lamp 11, a light diffusing sheet 13 provided on a front-surface side of the light guiding plate 12, and a prism sheet 14 provided on a front-surface side of the light diffusing sheet 13. Although one prism sheet 14 is shown in FIG. 6, two prism sheets 14 may be provided such that prism portions 14a of one of the two prism sheets 14 are perpendicular to those of the other.

A function of the back light unit 10 will now be described. Light rays emitted from the lamp 11 enter the light guiding plate 12, are reflected by reflection dots or a reflection sheet provided on a back surface of the light guiding plate 12 and side surfaces thereof, and emanate from a surface thereof. Then, the light rays emanating from the light guiding plate 12 enter the light diffusing sheet 13, are diffused therein, and emanate from a surface thereof. Thereafter, the light rays emanating from the light diffusing sheet 13 enter the prism sheet 14, and emanate from a surface thereof, thereby illuminating the entire surface of the liquid crystal layer (not shown) provided above.

Figure 7:
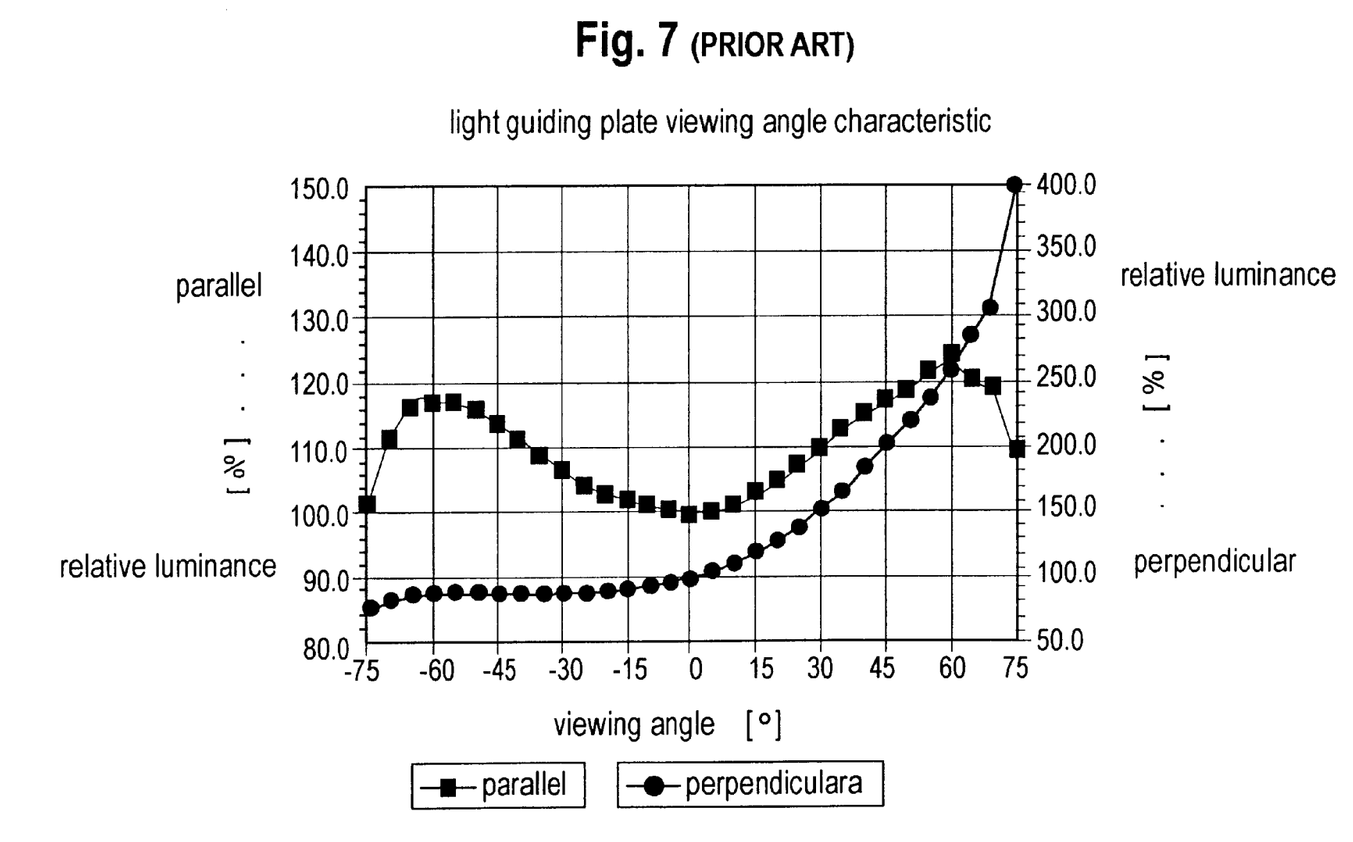
FIG. 7 is a graph showing relative luminance distribution of light rays emanating from a light guiding plate, in a known device.

Luminance distributions of the light rays emanating from the surface of the light guiding plate 12, when viewed in a direction perpendicular to the lamp 11 and in a direction parallel to the lamp 11, differ from each other. For instance, as shown in FIG. 7, in some light guiding plates 12, the luminance distribution in the direction perpendicular to the lamp 11 has a high peak diagonally above on an opposite side of the lamp 11, and the luminance distribution in the direction parallel to the lamp 11 has right and left peaks diagonally above that are relatively lower than that of the luminance distribution in the direction perpendicular to the lamp 11.

Specific examples of the conventional light diffusing sheet 13 are as follows:

(a) A binder in which a light diffusing material such as beads is dispersed is applied to a surface of abase sheet to form a light diffusing layer with the light diffusing material dispersed therein on the surface(see Utility Model Application Publication Hei. No.5-73602).

(b) When forming a synthetic resin sheet, a plurality of convex regions and concave regions are formed on a surface thereof by embossing and the like.

Since the above-described conventional light diffusing sheet 13 exhibits a light diffusing ability because of the light diffusing material such as the dispersed beads or the convex regions and concave regions on the surface thereof, the light diffusing ability is the same over the entire surface and in all directions of the sheet.

For this reason, if the diffusing ability of the light diffusing sheet 13 is adapted to either the luminance distribution in the direction perpendicular to the lamp 11 or the luminance distribution in the direction parallel to the lamp 11 and thereby the amount of light emanating in a normal direction (normal direction of respective sheets disposed parallel to one another) in the luminance distribution in one direction is increased, then the amount of light emanating in the normal direction in the luminance distribution in the other direction is not increased. In a case where the luminance distribution of the light rays emanating from the light guiding plate 12 is that shown in FIG. 7, if the diffusing ability of the light diffusing sheet 13 is adapted to the luminance distribution in the direction perpendicular to the lamp 11 that has the high peak diagonally above and thereby a peak light is refracted to some degrees toward the normal direction without greatly dispersing it, then the luminance distribution in the direction parallel to the lamp 11 that is relatively low and has the right and left peaks diagonally above is almost the same as the distribution in which the light rays emanate from the surface of the light guiding plate 12, and consequently, the amount of the light emanating in the normal direction remains small.

Conversely, if the diffusing ability of the light diffusing sheet 13 is adapted to the luminance distribution in the direction parallel to the lamp 11 that is relatively low and has the right and left peaks diagonally above to be thereby enhanced for the purpose of increasing the amount of the light emanating in the normal direction, then a strong peak light in the luminance distribution in the direction perpendicular to the lamp 11 is greatly dispersed, and thereby the amount of light emanating in the normal direction is reduced.

SUMMARY OF THE INVENTION

The present invention is directed to solving the above problems, and an object of the present invention is to provide a light diffusing sheet capable of changing a backward and forward diffusing ability and a right and left diffusing ability to be adapted to luminance distribution in a direction perpendicular to a lamp and luminance distribution in a direction parallel to the lamp, and thereby increasing light emanating in a normal direction in either direction, and a back light unit using the light diffusing sheet.

In one aspect of the present invention, a light diffusing sheet for use in a back light unit for a liquid crystal display includes light diffusing means which has a backward and forward diffusing ability and a right and left diffusing ability that differ from each other. The expression "backward and forward diffusing ability" as used herein refers to a diffusing ability of light rays on a backward and forward plane perpendicular to the sheet surface. The expression "right and left diffusing ability" as used herein refers to a light diffusing ability of light rays on a right and left plane perpendicular to the sheet surface. For convention purposes herein, the backward and forward plane and the backward and forward direction may be considered as extending along the direction B, in the drawings, and the right and left plane and the right and left direction may be considered as extending along the direction A. These directions are examples, however. As illustrated and described, the right and left direction may be considered a first direction and the backward and forward direction may be considered a second direction that is different than the first direction. In an example, the first and second direction may be perpendicular to one another.

With this configuration, the light diffusing means enables to set the backward and forward diffusing ability and the right and left diffusing ability so that they differ from each other. Hence, when a back light unit comprising a) a liner lamp; b) a light guiding plate provided along the lamp for guiding light rays emitted from the lamp to a surface side of the sheet; and c) a light diffusing sheet provided on a surface side of the light guiding plate, uses the above light diffusing sheet as the light diffusing sheet, the diffusing ability of the light diffusing sheet can be adapted to both the luminance distribution in the direction perpendicular to the lamp and the luminance distribution in the direction parallel to it, and the amount of light emanating in the normal direction can be increased in the luminance distribution in either direction. Therefore, in case of the emanating light rays of the light guiding plate represented by luminance distribution the direction perpendicular to the lamp that has a relatively high peak diagonally above on an opposite side of the lamp and luminance distribution in the direction parallel to the lamp that is relatively low and has right and left peaks diagonally above, the diffusing ability of the light diffusing sheet in the direction perpendicular to the lamp is reduced, whereas the diffusing ability in the direction parallel to the lamp is increased. Thereby, the luminance distribution in the direction perpendicular to the lamp has the light that is not diffused so much and reduction of the light emanating in the normal direction is avoided, while the luminance distribution in the direction parallel to the lamp increases the light emanating in the normal direction because of the high diffusing ability. In brief, the light emanating in the normal direction can be increased in either direction. In addition, in case of the light guiding plate that has a smaller viewing angle in the backward and forward direction or in the right and left direction, the light diffusing sheet of the present invention is placed such that the diffusing ability in the direction of the smaller viewing angle becomes higher and the diffusing ability in the opposite direction becomes lower, whereby the viewing angle is efficiently made larger.

As the light diffusing means, there may be formed a plurality of longitudinally divided spindle shaped convex regions or concave regions on the sheet surface with their central axes (longitudinal axes) arranged in a backward and forward direction or in a right and left direction. The term "spindle shaped" as used herein denotes a shape in which both ends of a column which has a length in a central axis direction larger than a diameter are gradually thinned, and includes an ellipsoid obtained by rotation using a long axis as a center, or a rotator obtained by rotating a circular arc using its chord as a center, for example. The expression "longitudinal divided" as used herein means that division is conducted along a plane parallel to a central axis of the spindle shape. According to this means, each of the convex regions or the concave regions has a backward and forward cross section different from a right and left cross section in shape. Specifically, the cross section in the direction parallel to the central axis has a curvature of the convex region or the concave region lower than that of the cross section in the direction perpendicular to the central axis. When the concave regions or the convex regions are provided in contact with one another, the number of the convex regions or the concave regions per unit length in the direction perpendicular to the central axes is larger than the number of the convex regions or the concave regions per unit length in the direction parallel to the central axes. For this reason, according to this light diffusing means, the diffusing ability in the direction perpendicular to the central axes of the convex regions or the concave regions is made higher than the diffusing ability in the direction parallel to the central axes of the convex regions or the concave regions, and the central axes are arranged in the right and left direction or in the backward and forward direction to thereby make the backward and forward diffusing ability and the right and left diffusing ability different from each other.

In addition, as the light diffusing means, there may be formed a plurality of quadrangular pyramid shaped convex regions or concave regions with rectangular bottom surfaces on the sheet surface with their long sides arranged in the backward and forward direction or in the right and left direction. According to this means, each of the cross sections in the direction parallel to the long sides of the bottom surfaces of the concave regions or the concave regions has an inclination gentler than that of each of the cross sections in the direction perpendicular to the long sides of the bottom surfaces, and the number of convex regions or concave regions per unit length in the direction perpendicular to the long sides is larger than the number of convex regions or concave regions per unit length in the direction parallel to the long sides. Therefore, the diffusing ability in the direction perpendicular to the long sides of the bottom surfaces of the convex regions or the concave regions is made higher than the diffusing ability in the direction parallel to the long sides of the bottom surfaces of the convex regions or the concave regions, and the long sides of the bottom surfaces are arranged in the right and left direction or in the backward and forward direction to thereby make the backward and forward diffusing ability and the right and left diffusing ability different from each other.

Further, as the light diffusing means, a light diffusing material of a spindle shape can be dispersed in the sheet with central axes thereof arranged in the backward and forward direction or in the right and left direction, or a light diffusing layer in which the light diffusing material of the spindle shape can be dispersed with central axes thereof directed in the backward and forward direction or in the right and left direction is formed on the sheet surface. According to these means, like the above light diffusing means, the cross section of the light diffusing material in the direction parallel to the central axes has the curvature lower than that of the cross section in the direction perpendicular to the central axes, and the number of the light diffusing material in the direction perpendicular to the central axes is larger than the number of the light diffusing material in the direction parallel to the central axes, so that the central axes of the light diffusing material are arranged in the right and left direction or in the backward and forward direction to thereby make the backward and forward diffusing ability and the right and left diffusing ability different from each other.

Still further, as the light diffusing means, there may be formed convex and concave regions on the sheet surface using a hologram technique. The expression "convex and concave regions formed using the hologram technique" as used herein refers to convex and concave regions obtained by making a light ray having a preferable characteristic as an emanating light ray (light ray having backward and forward luminance distribution and right and left luminance distribution that differ from each other) and a light ray having a characteristic of an incident light ray interfere with each other and by recording data on the sheet surface. According to this light diffusing means, when the incident light ray having the characteristic is applied to the light diffusing sheet, the emanating light ray having the preferable characteristic can be reproduced.

Moreover, there may be formed a plurality of convex prism portions each having a triangular cross section such that they are arranged in the backward and forward direction or in the right and left direction on the surface of the light diffusing sheet. According to the light diffusing sheet, a peak direction in the luminance distribution in the direction perpendicular to the prism portions can be refracted upward by using the prism portions. For this reason, the prism sheet may be dispensed with, or one prism sheet can serve as two prism sheets.

As described above, according to the light diffusing sheet of the present invention, it is possible to achieve the diffusing effect according to the difference between the light collecting characteristic in the direction parallel to the prism portions of the prism sheet or the prism portions of the light diffusing sheet and the light collecting characteristic in the direction perpendicular thereto, and thereby increase the amount of light emanating in the normal direction in either direction.

The back light unit using the light diffusing sheet is capable of reducing luminance nonuniformity of a screen of the liquid crystal display. In addition, the unit is capable of eliminating a peculiar pattern represented by the emanating light rays of the light guiding plate. Further, the unit is capable of significantly reducing reflection of light between constituents, and thereby emanating the light rays upward efficiently.

DESCRIPTION OF THE PREFERRED EMBODIMENTS

Hereinafter, preferred embodiments of the present invention will be described with reference to the accompanying drawings.

Figure 1:
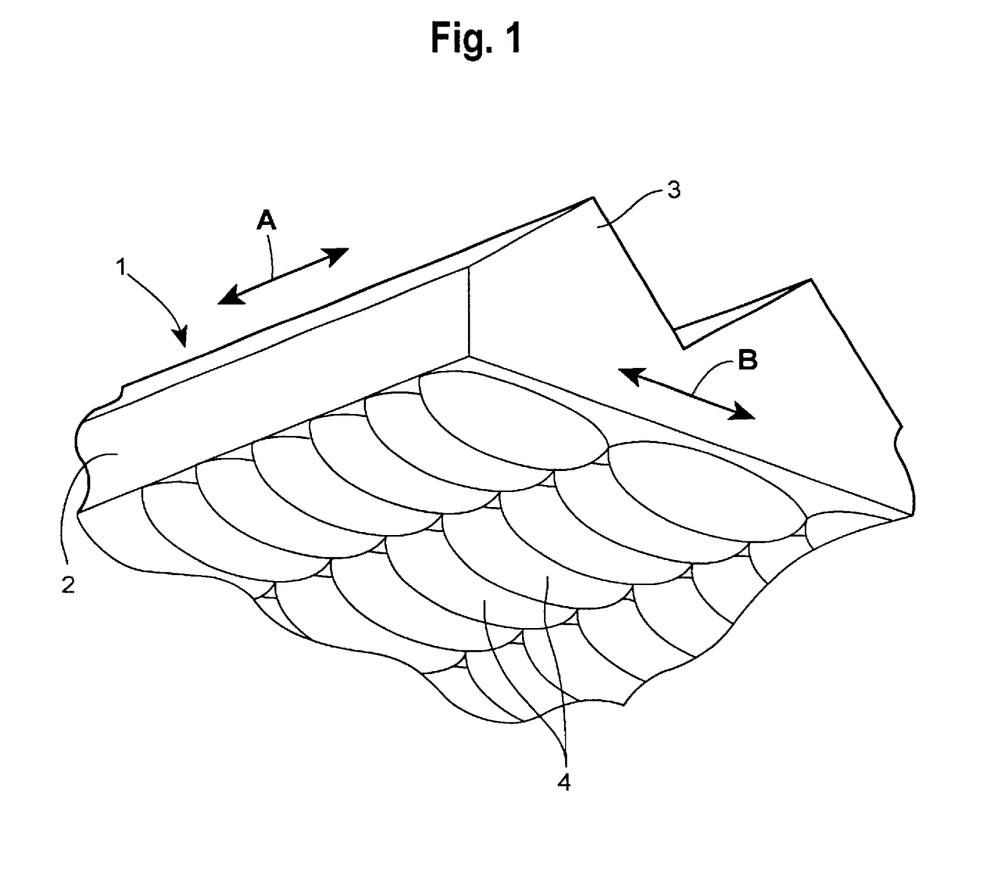
FIG. 1 is a perspective view showing a light diffusing sheet according to a first embodiment of the present invention.
Figure 2A:
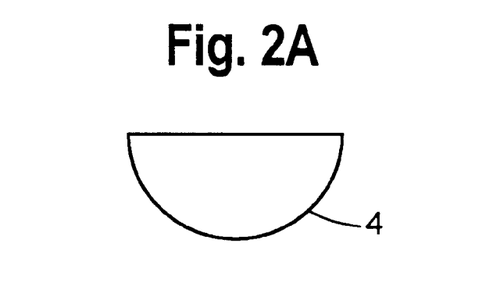
FIGS. 2A, 2B, and 2C are an elevational view, a side view, and a rear elevation view of a convex region of the light diffusing sheet shown in FIG. 1, respectively.
Figure 2B:
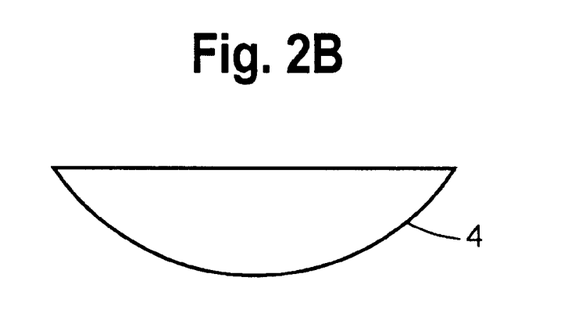
Figure 2C:
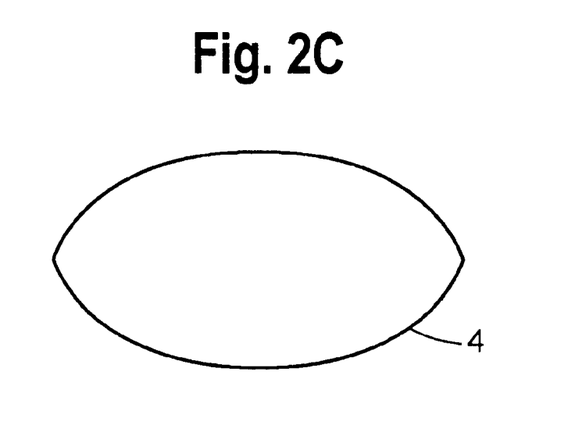

Referring now to FIG. 1, a light diffusing sheet 1 has a plurality of convex prism portions 3 each having a triangle-shaped cross section formed on a surface of a sheet portion 2. The plurality of prism portions 3 are provided in parallel and in close proximity to one another such that their longitudinal direction is a right and left direction. In the back light unit, the light diffusing sheet 1 is placed such that its right and left direction is parallel to the lamp, that is, the prism portions 3 are parallel to the lamp 11 (see FIG. 6), in order to control a peak direction of passing light rays by refracting a peak direction of the luminance distribution of the light rays emanating from the light guiding plate on a plane perpendicular to the lamp toward the normal direction by side surfaces of the prism portions 3.

The light diffusing sheet 1 has a plurality of convex regions 4 formed on a back surface of the sheet portion 2 as light diffusing means. As shown in FIG. 1 and FIGS. 2A–2C, each of the convex regions 4 has a shape obtained by dividing a spindle (a rotator created by rotating a circular arc with its chord as a center) in half along a plane passing its central axis. These convex regions 4 are placed in close proximity to one another such that their central axis direction is parallel to the backward and forward direction (e.g., along direction B), that is, perpendicular to the longitudinal direction of the prism portions 3, which are, for example, along direction A. The convex regions 4 have a right and left curvature higher than a backward and forward curvature. Also, the number of right to left convex regions 4 per unit length, i.e., along direction A, is larger than that of backward to forward convex regions 4 per unit length, i.e., along direction B. For this reason, the light diffusing sheet 1 has a right and left diffusing ability higher than a backward and forward diffusing ability. The direction A may be termed a first direction, and the direction B may be termed a second direction.

In a case where a light emanating (outgoing) characteristic of the light guiding plate 12 of the back light unit 10 shown in FIG. 6 is the luminance distribution shown in FIG. 7, when the light diffusing sheet 1 is used as the light diffusing sheet 13, and the prism portions 3 of the light diffusing sheet 1 are placed parallel to the lamp 11, the luminance distribution in the direction perpendicular to the lamp 11 has the normal direction light collected by the prism portions 3 and prism sheet 14 that is not diffused because of the low diffusing ability of the light diffusing sheet 1 and does not reduce the light emanating in the normal direction so much, while the luminance distribution in the direction parallel to the lamp 11 increases the light emanating in the normal direction because of the high diffusing ability of the light diffusing sheet 1. In other words, the light emanating in the normal direction can be increased in the luminance distribution in either direction.

The light diffusing sheet 1 is transparent because it needs to transmit light rays and is preferably colorless and transparent. The material of the light diffusing sheet 1 is not limited and synthetic resin such as polyethylene terephthalate, polyethylene naphthalate, acrylic resin, polycarbonate, polystyrene, polyolefin, cellulose acetate, weather-resistant vinyl chloride, and the like is used. The size of the light diffusing sheet 1 is not limited, either, but the thickness of the sheet portion 2 is set to 50–250 $\mu$m. If the thickness of the sheet portion 2 is less than 50 $\mu$m, then the strength of the light diffusing sheet is not ensured. On the other hand, if the thickness is more than 250 $\mu$m, the luminance of the liquid crystal display is reduced, and the thickness of the back light unit is increased, which is contrary to requirements for a lighter and thinner liquid crystal display. As for the size of the prism portions 3, the triangular cross section has a base of 30–200 $\mu$m and a height of 10–200 $\mu$m. The convex regions 4 have a length of 5–500 $\mu$m and a height of 5–100 $\mu$m from the back surface of the sheet portion 2.

There are several methods for forming the convex regions 4 of the fight diffusing sheet 1, which include i) providing synthetic resin forming the light diffusing sheet 1 on a sheet mold having a shape obtained by inverting the shape of the convex regions 4 and then peeling the sheet mold to thereby form the convex regions 4 on the back surface of the sheet portion 2, ii) injecting melted resin into a gold mold having the inverted shape of the convex regions 4 (injection molding method), iii) reheating sheeted resin, putting it between a gold mold similar to the above and a metal plate, and pressing it to transfer a shape, iv) passing melted and sheeted resin through a nip between a roll having the inverted shape of the convex regions 4 on its periphery plane and another roll to transfer the shape (extrusion sheet molding method), v) applying UV curing resin to a base film and pressing it against a roll having the above inverted shape to transfer the shape to uncured UV curing resin, followed by application of ultra violet rays so as to cure the UV curing resin, vi) using EB curing resin instead of UV curing resin, vii) applying paint mixed with the spindle-shaped light diffusing material such that central axes thereof are arranged.

Figure 3A:
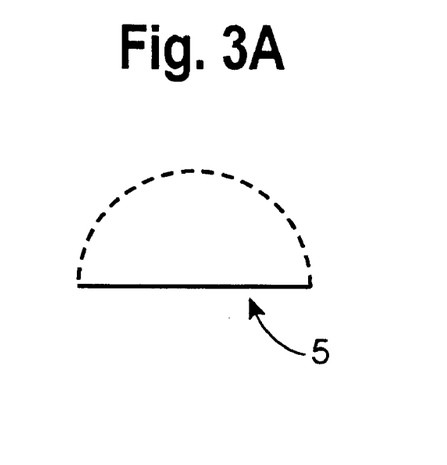
FIGS. 3A, 3B, and 3C are an elevational view, a side view, and a rear elevation view of a concave region of a light diffusing sheet according to a second embodiment, respectively.
Figure 3B:
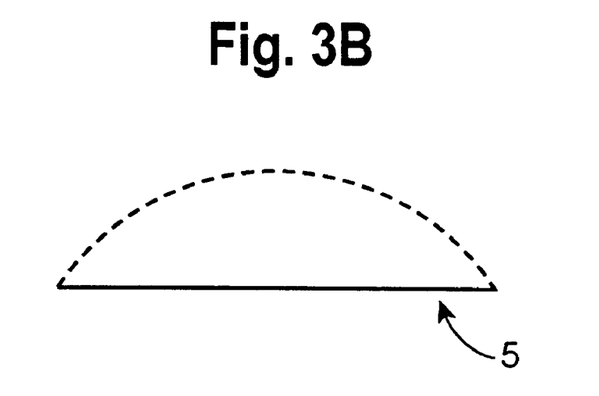
Figure 3C:
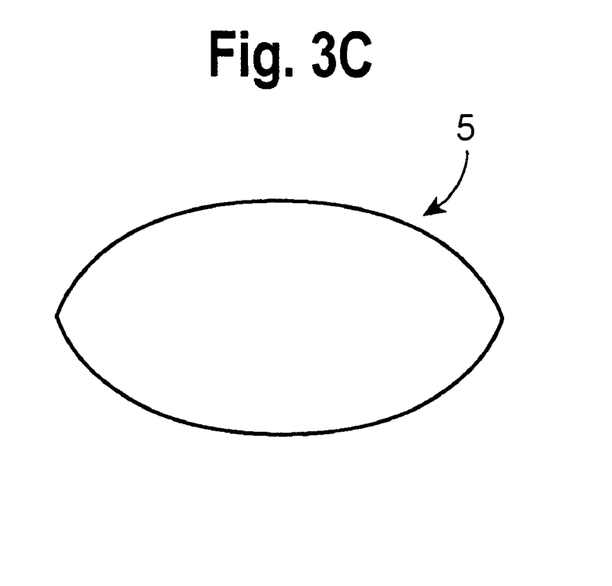

The light diffusing sheet according to the second embodiment has concave regions 5 on the back surface of the sheet portion 2 as shown in FIGS. 3A–3C as light diffusing means. The concave regions 5 have a shape identical to that of the convex regions 4 of the first embodiment and the difference between them is convexity and concavity. Hence, the concave regions 5 have also the right and left curvature higher than the backward and forward curvature, and the number of right and left concave regions 5 per unit length is larger than that of backward and forward concave regions 5 per unit length, so that this light diffusing sheet also has the right and left diffusing ability higher than the backward and forward diffusing ability, like the light diffusing sheet 1. As a consequence, in the back light unit using this light diffusing sheet like the light diffusing sheet 1, the luminance distribution in the direction perpendicular to the lamp has the light that is not diffused so much because of the low diffusing ability and thereby the amount of the light emanating in the normal direction is not reduced, while the luminance distribution in the direction parallel to the lamp increases the amount of light emanating in the normal direction because of the high diffusing ability.

Figure 4A:
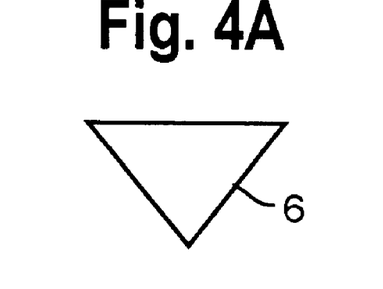
FIGS. 4A, 4B, and 4C are an elevational view, a side view, and a rear elevation view of a convex region of a light diffusing sheet according to a third embodiment, respectively.
Figure 4B:
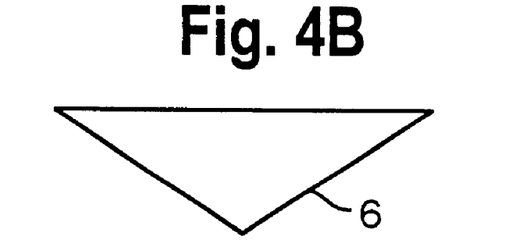
Figure 4C:
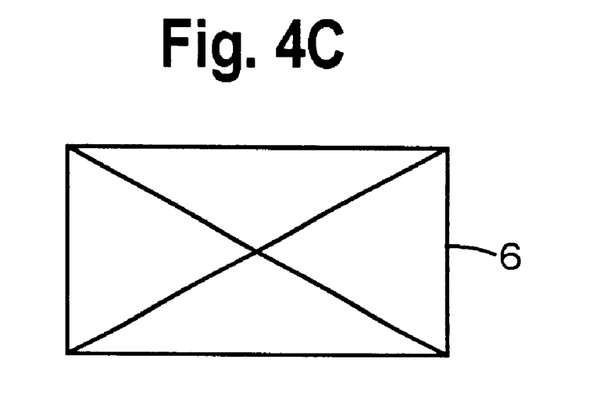

The light diffusing sheet according to the third embodiment has convex regions 6 on the back surface of the sheet portion 2 as shown in FIGS. 4A–4C as light diffusing means. Each of the convex regions 6 is quadrangular pyramid shaped with a rectangular bottom surface. The convex regions 6 are formed adjacently to one another such that the long sides of the bottom surfaces are parallel to the backward and forward direction. Therefore, the convex regions 6 have a right and left inclination angle larger than a backward and forward inclination angle, and the number of right and left convex regions 6 per unit length is larger than backward and forward convex regions 6 per unit length. Hence, like the light diffusing sheet 1, this light diffusing sheet has the right and left diffusing ability higher than the backward and forward diffusing ability. As a consequence, in the back light unit using this light diffusing sheet like the light diffusing sheet 1, the light emanating in the normal direction can be increased in either direction, i.e., in the right and left direction or in the backward and forward direction.

Figure 5A:
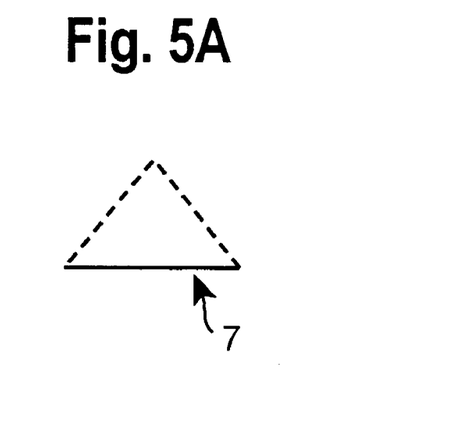
FIGS. 5A, 5B, and 5C are an elevational view, a side view, and a rear elevation view of a concave region of a light diffusing sheet according to a fourth embodiment, respectively.
Figure 5B:
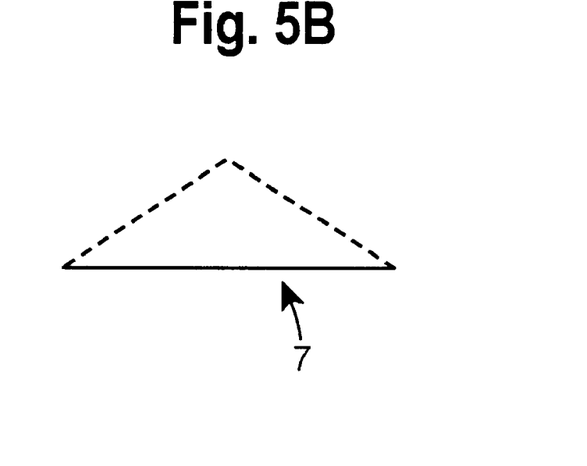
Figure 5C:
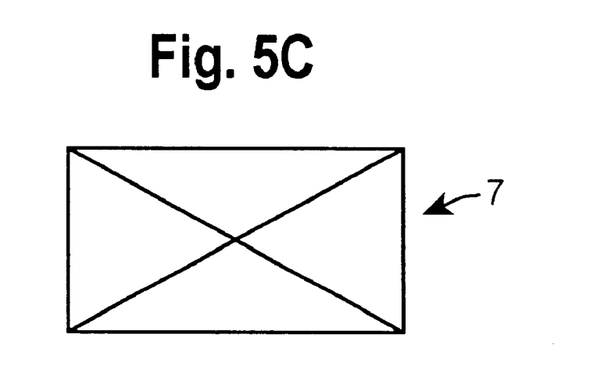

The light diffusing sheet according to the fourth embodiment has concave regions 7 on the back surface of the sheet portion 2 as shown in FIGS. 5A–5C as light diffusing means. The concave regions 7 have a shape identical to that of the convex regions 6 of the third embodiment and the difference between them is convexity and concavity. Therefore, like the light diffusing sheet 1, this light diffusing sheet having the concave regions 7 has the right and left diffusing ability higher than the backward and forward diffusing ability.

Figure 5D:
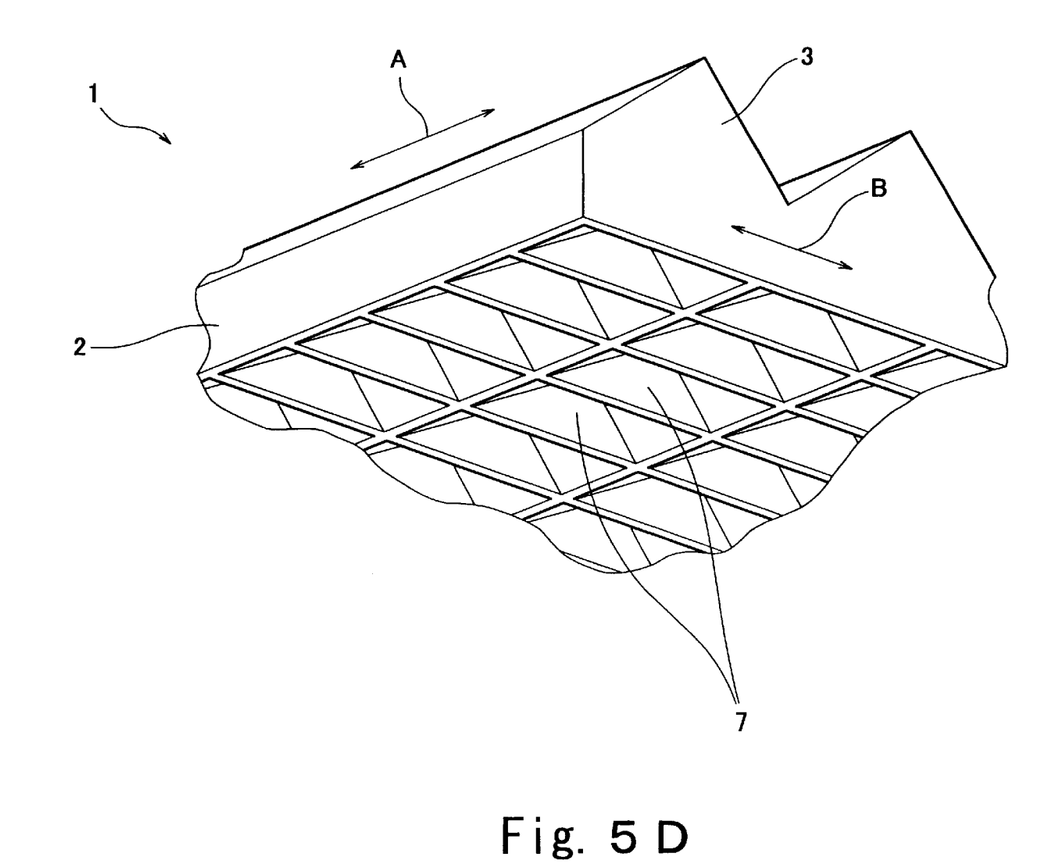
FIG. 5D is a perspective view showing a light diffusing sheet according to an example embodiment having concave regions in accordance with FIGS. 5A–5C.

As a consequence, in the back light unit using this light diffusing sheet, the light emanating in the normal direction can be increased in either direction. FIG. 5D illustrates an example embodiment.

Having thus far described several preferred embodiments, the light diffusing sheet of the present invention is not limited to these, and for instance, the followings are conceived.

(1) To obtain light diffusing means, a light diffusing material of a spindle shape is dispersed in the sheet portion 2 and central axes of the light diffusing material are directed in the backward and forward direction. Such a light diffusing material makes the right and left diffusing ability higher than the backward and forward diffusing ability.

(2) To obtain light diffusing means, a light diffusing layer in which the light diffusing material of the spindle shape is dispersed with central axes thereof directed in the backward and forward is formed on the back surface of the sheet portion 2. This light diffusing layer also makes the right and left diffusing ability higher than the backward and forward diffusing ability.

(3) The light diffusing sheet with the above light diffusing means may omit the prism portions 3. This light diffusing sheet is capable of increasing the light emanating in the normal direction according to the difference between the luminance distribution in the direction perpendicular to the prism portions 14a of the prism sheet 14 and the luminance distribution in the direction parallel thereto.

(4) When the light rays emanating from the light guiding plate 12 does not have the luminance distribution shown in FIG. 7, but instead, the luminance distribution in the direction parallel to the lamp has a high peak and the luminance distribution in the direction perpendicular to the lamp is relatively low and has no remarkable peak, the convex regions 4, the concave regions 5, the convex regions 6 and the concave regions 7 used as the light diffusing ability are arranged in the right and left forward rather than in the backward and forward direction, to thereby make the backward and forward diffusing ability higher than the right and left diffusing ability, unlike the above embodiments. Thereby, in the back light unit using this light diffusing sheet, the luminance distribution in the direction perpendicular to the lamp increases the light emanating in the normal direction because of the high diffusing ability, while the luminance distribution in the direction parallel to the lamp has the light that is not diffused so much because of the low diffusing ability, and thereby reduction of the light emanating in the normal direction can be avoided.

What is claimed is:

1. A light diffusing sheet for use in a back light unit for a liquid crystal display, including:

light diffusing means which has a first diffusing ability in a first direction and a second diffusing ability in a second direction perpendicular to the first direction, where the second diffusing ability differs from the first diffusing ability, wherein said light diffusing means comprises a plurality of longitudinally divided spindle shaped convex regions or longitudinally divided spindle shaped concave regions formed on a surface of said sheet with their central axes arranged along the first direction or along the second direction.

2. The light diffusing sheet according to claim 1, wherein said light diffusing means is formed of a light diffusing material of a spindle shape dispersed in said sheet with the central axes arranged along the first direction or along the second direction.

3. The light diffusing sheet according to claim 1, wherein said light diffusing means is a light diffusing layer formed on the surface of said sheet and formed of a light diffusing material of a spindle shape dispersed on said sheet with the central axes arranged along the first direction or along the second direction.

4. The light diffusing sheet according to claim 1, wherein said light diffusing means comprises the concave regions or the convex regions formed using a hologram technique.

5. The light diffusing sheet according to claim 1, further comprising a plurality of convex prism portions each having a triangular cross section and each extending in a longitudinal direction that is parallel to the first direction or parallel to the second direction, the plurality of convex prism portions being disposed on another surface of said light diffusing sheet opposite the light diffusion means.

6. The light diffusing sheet of claim 1, wherein the first direction is a right and left direction parallel to a side of the back light for receiving a light source and wherein the second direction is a backward and forward direction perpendicular to the side.

7. A back light unit for a liquid crystal display, comprising:

a liner lamp;

a light guiding plate provided along said lamp for guiding light rays emitted from said lamp to a surface side; and a light diffusing sheet provided on a surface of said light guiding plate such that a first direction of said light diffusing sheet is parallel to said lamp and a second direction is perpendicular to said lamp, wherein the light diffusing sheet has a diffusing ability in the second direction that is different than a light diffusing ability in the first direction, and wherein said light diffusing sheet comprises a plurality of longitudinally divided spindle shaped convex regions or longitudinally divided spindle shaped concave regions formed on the surface of said sheet with their central axes along the first direction or along the second direction.

8. The back light of claim 7, wherein the first direction is a right and left direction parallel to the liner lamp and wherein the second direction is a backward and forward direction perpendicular to the liner lamp.

* * * * *